United States Patent
Lee et al.

(10) Patent No.: US 10,505,728 B2
(45) Date of Patent: *Dec. 10, 2019

(54) PHYSICALLY UNCLONABLE FUNCTION CIRCUITS AND METHODS OF PERFORMING KEY ENROLLMENT IN PHYSICALLY UNCLONABLE FUNCTION CIRCUITS

(71) Applicant: Samsung Electronics Co., Ltd., Suwon-si, Gyeonggi-do (KR)

(72) Inventors: Yong Ki Lee, Yongin-si (KR); Yongsoo Kim, Suwon-si (KR); Bohdan Karpinskyy, Suwon-si (KR); Yunhyeok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,626

(22) Filed: Jun. 29, 2018

(65) Prior Publication Data

US 2018/0323968 A1    Nov. 8, 2018

Related U.S. Application Data

(63) Continuation of application No. 14/940,749, filed on Nov. 13, 2015, now Pat. No. 10,027,480.

(30) Foreign Application Priority Data

Nov. 28, 2014  (KR) .................. 10-2014-0168505

(51) Int. Cl.
*H04L 9/00* (2006.01)
*H04L 9/08* (2006.01)
*H04L 9/30* (2006.01)

(52) U.S. Cl.
CPC ............ *H04L 9/088* (2013.01); *H04L 9/0866* (2013.01); *H04L 2209/046* (2013.01); *H04L 2209/34* (2013.01)

(58) Field of Classification Search
CPC ............. G06F 11/108; H04L 2209/046; H04L 2209/34; H04L 9/0866; H04L 9/088; H04L 9/3278

(Continued)

(56) References Cited

U.S. PATENT DOCUMENTS 7,840,803 B2    11/2010  Clarke et al.
7,929,701 B1 *   4/2011  Sprunk ................. G06F 21/606
                                                  380/277

(Continued)

FOREIGN PATENT DOCUMENTS

JP    2013003431      1/2013
JP    5420114 B2      2/2014

(Continued)

OTHER PUBLICATIONS

Böhm et al., "A Microcontroller SRAM-PUF", International Conference on Network and System Security (NSS), 2011, pp. 269-273.

(Continued)

*Primary Examiner* — Gary S Gracia
(74) *Attorney, Agent, or Firm* — Sughrue Mion, PLLC

(57) ABSTRACT

A key enrollment method of a physically unclonable function (PUF) circuit including a plurality of PUF cells includes receiving a first level key from PUF cells, performing bit encoding on the first level key using a bit coding table based on Hamming weights of a plurality of bits in the first level key to generate a second level key, storing first helper data associated with the second level key in a non-volatile memory, performing block encoding on the second level key using an error correction code to generate a third level key, (Continued)

and storing second helper data associated with the third level key in the non-volatile memory.

19 Claims, 14 Drawing Sheets

(58) Field of Classification Search
USPC .......................................... 326/8; 380/44, 45
See application file for complete search history.

(56) References Cited

U.S. PATENT DOCUMENTS

| | | | |
|---|---|---|---|
| 8,510,608 B2 | 8/2013 | Futa et al. | |
| 8,667,265 B1* | 3/2014 | Hamlet | H04L 9/0866 326/80 |
| 8,684,856 B2 | 4/2014 | Pyrce et al. | |
| 8,819,409 B2 | 8/2014 | Kulpers et al. | |
| 8,848,477 B2 | 9/2014 | Schrijen et al. | |
| 9,031,232 B2 | 5/2015 | Suzuki | |
| 9,048,834 B2 | 6/2015 | Li et al. | |
| 2003/0097571 A1* | 5/2003 | Hamilton | G06Q 20/00 713/182 |
| 2005/0270911 A1* | 12/2005 | Kashihara | G11B 7/00718 369/30.01 |
| 2010/0002875 A1* | 1/2010 | Li | H04N 7/1675 380/42 |
| 2010/0031065 A1* | 2/2010 | Futa | H03K 3/0315 713/194 |
| 2012/0066571 A1* | 3/2012 | Marinet | G06F 21/73 714/773 |
| 2012/0072737 A1* | 3/2012 | Schrijen | H04L 9/3278 713/189 |
| 2012/0131244 A1* | 5/2012 | Abbasfar | G06F 13/4265 710/105 |
| 2012/0183135 A1* | 7/2012 | Paral | H04L 9/0866 380/44 |
| 2012/0204023 A1* | 8/2012 | Kuipers | G06F 21/10 713/150 |
| 2012/0324310 A1 | 12/2012 | Oshida et al. | |
| 2013/0051552 A1* | 2/2013 | Handschuh | G06F 21/602 380/44 |
| 2013/0254636 A1* | 9/2013 | Kirkpatrick | H04L 9/0866 714/784 |
| 2014/0089685 A1 | 3/2014 | Suzuki | |
| 2014/0091832 A1* | 4/2014 | Gotze | H03K 19/003 326/8 |
| 2014/0093074 A1* | 4/2014 | Gotze | H04L 9/0866 380/45 |
| 2014/0189365 A1* | 7/2014 | Cox | G06F 21/72 713/189 |
| 2014/0325237 A1* | 10/2014 | Van Der Leest | G06F 21/72 713/189 |
| 2014/0325241 A1 | 10/2014 | Shimizu | |
| 2015/0092939 A1* | 4/2015 | Gotze | H04L 9/34 380/2 |
| 2015/0195085 A1 | 7/2015 | Kim et al. | |

FOREIGN PATENT DOCUMENTS

| | | |
|---|---|---|
| KR | 1011188260000 | 2/2012 |
| KR | 1013938060000 | 5/2014 |
| KR | 1020140093276 | 6/2014 |
| WO | WO 2013/083415 A2 | 6/2013 |

OTHER PUBLICATIONS

Helena Handschuh, "Hardware-Anchored Security Based on SRAM PUFs, Part1", IEEE Security & Privacy 10(3), 2012, pp. 80-83.
Merli et al. "Protecting PUF Error Correction by Codeword Masking", *IACR Cryptology ePrint Archive*, vol. 2013, pp. 334, 2013.
Meng-Day (Mandel) Yu et al. "Secure and Robust Error Correction for Physical Unclonable Functions", IEEE Design & Test of Computers (2010), pp. 48-64.

* cited by examiner

FIG. 2

| Pi (L1_Key) | Mi (Mask Data) | Ri (Pi XOR Mi) | Ki (L2_Key) | Hi (Helper Data) |
|---|---|---|---|---|
| 000 | 000 | 000 | 0 | 000 |
| 001 | 110 | 111 | 1 | 110 |
| 010 | 101 | 111 | 1 | 101 |
| 011 | 011 | 000 | 0 | 011 |
| 100 | 011 | 111 | 1 | 011 |
| 101 | 101 | 000 | 0 | 101 |
| 110 | 110 | 000 | 0 | 110 |
| 111 | 000 | 111 | 1 | 000 |

FIG. 3

| Pi (L1_Key) | Mi (Mask Data) | Ri (Pi XOR Mi) | Ki (L2_Key) | Hi (Helper Data) |
|---|---|---|---|---|
| 000 | 000 | 000 | 0 | 00 |
| 001 | 110 | 111 | 1 | 11 |
| 010 | 101 | 111 | 1 | 10 |
| 011 | 011 | 000 | 0 | 01 |
| 100 | 011 | 111 | 1 | 01 |
| 101 | 101 | 000 | 0 | 10 |
| 110 | 110 | 000 | 0 | 11 |
| 111 | 000 | 111 | 1 | 00 |

FIG. 4

| Pi<br>(L1_Key) | Mi<br>(Mask Data) | Ri<br>(Pi XOR Mi) | Ki<br>(L2_Key) | Hi<br>(Helper Data) |
|---|---|---|---|---|
| 000 | 000 | 000 | 0 | 00 |
| 001 | 110 | 111 | 1 | 10 |
| 010 | 101 | 111 | 1 | 11 |
| 011 | 011 | 000 | 0 | 01 |
| 100 | 011 | 111 | 1 | 01 |
| 101 | 101 | 000 | 0 | 11 |
| 110 | 110 | 000 | 0 | 10 |
| 111 | 000 | 111 | 1 | 00 |

FIG. 5

| Pi<br>(L1_Key) | Mi<br>(Mask Data) | Ri<br>(Pi XOR Mi) | Ki<br>(L2_Key) | Hi<br>(Helper Data) |
|---|---|---|---|---|
| 000 | 000 | 000 | 0 | 00 |
| 001 | 110 | 111 | 1 | 10 |
| 010 | 101 | 111 | 1 | 01 |
| 011 | 011 | 000 | 0 | 11 |
| 100 | 011 | 111 | 1 | 11 |
| 101 | 101 | 000 | 0 | 01 |
| 110 | 110 | 000 | 0 | 10 |
| 111 | 000 | 111 | 1 | 00 |

FIG. 6

| Pi<br>(L1_Key) | Mi<br>(Mask Data) | Ri<br>(Pi XOR Mi) | Ki<br>(L2_Key) | Hi<br>(Helper Data) |
|---|---|---|---|---|
| 000 | 111 | 111 | 1 | 111 |
| 001 | 001 | 000 | 0 | 001 |
| 010 | 010 | 000 | 0 | 010 |
| 011 | 100 | 111 | 1 | 100 |
| 100 | 100 | 000 | 0 | 100 |
| 101 | 010 | 111 | 1 | 010 |
| 110 | 001 | 111 | 1 | 001 |
| 111 | 111 | 000 | 0 | 111 |

FIG. 7

| Pi<br>(L1_Key) | Mi<br>(Mask Data) | Ri<br>(Pi XOR Mi) | Ki<br>(L2_Key) | Hi<br>(Helper Data) |
|---|---|---|---|---|
| 000 | 111 | 111 | 1 | 11 |
| 001 | 001 | 000 | 0 | 00 |
| 010 | 010 | 000 | 0 | 01 |
| 011 | 100 | 111 | 1 | 10 |
| 100 | 100 | 000 | 0 | 10 |
| 101 | 010 | 111 | 1 | 01 |
| 110 | 001 | 111 | 1 | 00 |
| 111 | 111 | 000 | 0 | 11 |

FIG. 8

| Pi<br>(L1_Key) | Mi<br>(Mask Data) | Ri<br>(Pi XOR Mi) | Ki<br>(L2_Key) | Hi<br>(Helper Data) |
|---|---|---|---|---|
| 00000 | 00000 | 00000 | 0 | 0000 |
| 00001 | 11110 | 11111 | 1 | 1111 |
| 00010 | 11101 | 11111 | 1 | 1110 |
| 00011 | 00011 | 00000 | 0 | 0001 |
| 00100 | 11011 | 11111 | 1 | 1101 |
| 00101 | 00101 | 00000 | 0 | 0010 |
| 00110 | 00110 | 00000 | 0 | 0011 |
| 00111 | 11000 | 11111 | 1 | 1100 |
| ⋮ | ⋮ | ⋮ | ⋮ | ⋮ |
| 11101 | 11101 | 00000 | 0 | 1110 |
| 11110 | 11110 | 00000 | 0 | 1111 |
| 11111 | 00000 | 11111 | 1 | 0000 |

FIG. 9

| Pi<br>(L1_Key) | Mi<br>(Mask Data) | Ri<br>(Pi XOR Mi) | Ki<br>(L2_Key) | Hi<br>(Helper Data) |
|---|---|---|---|---|
| 00000 | 11111 | 11111 | 1 | 1111 |
| 00001 | 00001 | 00000 | 0 | 0000 |
| 00010 | 00010 | 00000 | 0 | 0001 |
| 00011 | 11100 | 11111 | 1 | 1110 |
| 00100 | 00100 | 00000 | 0 | 0010 |
| 00101 | 11010 | 11111 | 1 | 1101 |
| 00110 | 11001 | 11111 | 1 | 1100 |
| 00111 | 00111 | 00000 | 0 | 0011 |
| ⋮ | ⋮ | ⋮ | ⋮ | ⋮ |
| 11101 | 00010 | 11111 | 1 | 0001 |
| 11110 | 00001 | 11111 | 1 | 0000 |
| 11111 | 11111 | 00000 | 0 | 1111 |

# PHYSICALLY UNCLONABLE FUNCTION CIRCUITS AND METHODS OF PERFORMING KEY ENROLLMENT IN PHYSICALLY UNCLONABLE FUNCTION CIRCUITS

CROSS-REFERENCE TO RELATED APPLICATIONS

The present application is a continuation of U.S. patent application Ser. No. 14/940,749, filed Nov. 13, 2015, which claims priority under 35 U.S.C. § 119 to Korean Patent Application No. 10-2014-0168505, filed Nov. 28, 2014, the entire contents of which are hereby incorporated here by reference in their entireties.

BACKGROUND

Embodiments of the inventive concepts described herein relate to physically unclonable function (PUF) circuits and methods of performing key enrollment in PUF circuits.

Cryptographic keys (or simply "keys") may be stored in electronic circuits, such as memory circuits. To prevent a key from being extracted by a physical attack, a circuit that stores the key may be configured to sense when a physical attack is occurring and to react to the attack by blocking the supply of power to the circuit or by destroying the circuit. The use of the sensors results in increasing process cost and may require the formation of new sub-channels in the circuit that may themselves be susceptible to attack. Current research is directed to the design of logic circuits that act like a fingerprint, i.e. digital circuits including logic implemented therein that generates keys without storing keys as data. PUF technology is representative of such approaches.

A PUF circuit is a circuit that takes advantage of the fact that wire delay and/or gate delay may differ slightly from one device to the next in the same circuit due to slight variations in process conditions during the manufacturing process. A PUF circuit may be implemented using small gate logic and may generate a random output. Delay differences due to variations in the process conditions may make it difficult to configure a circuit which has the same output value even if the PUF circuit is physically copied.

A PUF circuit may be classified as a ring oscillator type that uses a delay loop or an arbiter type that a switching circuit. Additionally, a PUF circuit may be implemented by using these two types together.

A PUF circuit is a small-sized circuit that is extremely difficult to duplicate. However, characteristics of the PUF circuit that make it unclonable may also make the circuit output different values due to slight variations in operating conditions. That is, the same characteristics of PUF circuits that make them difficult to clone also make them susceptible to generating incorrect output values. Adding error correction circuitry to a PUF circuit may help to prevent this phenomenon. However, doing so may result in adding additional circuitry to the PUF circuit and/or reducing the randomness of the data output by a PUF circuit.

SUMMARY

Embodiments of the inventive concepts provide PUF circuits that do not use random bits and key enrollment methods for PUF circuits.

One aspect of embodiments of the inventive concepts is directed to a key enrollment method of a PUF circuit that includes receiving a first level key from the PUF cells, the first level key comprising a plurality of key values, each of the key values comprising a plurality of bits, performing bit encoding on the first level key using a bit coding table based on Hamming weights of the plurality of bits in the key values of the first level key to generate a second level key, storing first helper data associated with the second level key in a non-volatile memory, performing block encoding on the second level key using an error correction code to generate a third level key, and storing second helper data associated with the third level key in the non-volatile memory.

Each of the PUF cells may include at least one of a PUF cell based on a transistor threshold voltage, an arbiter-based PUF cell, a ring-oscillator-based PUF cell, a memory-based PUF cell, and a thermal- or laser-reconfigurable PUF cell.

Each of the PUF cells may include a plurality of unit cells configured to output a plurality of bit values.

The bit coding table may include a PUF output value for each of the PUF cells, a key value based on a Hamming weight of the PUF output value, a mask data value configured to generate a predetermined value corresponding to the key value when the mask data value may be XORed with the PUF output value, and a helper data value associated with the mask data value.

The predetermined value may include a bit stream of all bits of "1" or "0" and may be configured to correct an error in a PUF output value of each of the PUF cells according majority decision in a bit decoding process.

The helper data value may include at least a part of the mask data value.

In some embodiments, the key value may be "1" when the Hamming weight may be an even number, and the key value may be "0" when the Hamming weight may be an odd number. In other embodiments, the key value may be "0" when the Hamming weight may be an even number, and the key value may be "1" when the Hamming weight may be an odd number.

The second helper data may be not masked by mask data in the blocking encoding.

The key enrollment method may further include masking the second helper data using a part of the second level key.

The key enrollment method may be initiated in response to a request of a user to a device including the PUF circuit.

A method of performing key generation for a physically unclonable function (PUF) circuit according to further embodiments includes receiving a first level key from PUF cells, receiving first helper data from a non-volatile memory, performing bit decoding on the first level key using a bit coding table based on Hamming weights and the first helper data to generate a second level key, receiving second helper data from the non-volatile memory, and performing block decoding on the second level key using an error correction code and the second helper data. The second level key may be generated according to majority decision of XORing values of the first helper data and the first level key when the bit coding may be performed.

The size of the first level key may be greater than the size of the second level key. The size of the second level key may be equal to a size of the third level key, and in some embodiments, the size of the second level key may be greater than the size of the third level key.

A physically unclonable function (PUF) circuit according to some embodiments includes a PUF cell array including a plurality of PUF cells, and an error correction unit configured to correct errors in a first level key output from the PUF cells. The error correction unit includes a bit encoder configured to perform bit encoding of the first level key using a bit coding table based on Hamming weights to generates a second level key and to store first helper data corresponding to the second level key in a non-volatile memory, and a block encoder configured to perform block encoding of the second level key using an error correction code to generate a third level key and to store second helper data corresponding to the third level key in the non-volatile memory.

The first helper data may include at least a part of mask data, and the mask data may be determined to generate a predetermined value when a PUF output value of each of the PUF cells and a bit value corresponding to a key value according to a Hamming weight of the PUF output value are XORed.

The error correction unit may further include an XOR gate configured to XOR a part of the second level key and the second helper data output from the bit encoder and output an output value. The output value of the XOR gate may be stored in the non-volatile memory.

The error correction unit may further include a bit decoder configured to perform bit decoding using the bit coding table and the first helper data read out from the non-volatile memory to correct an error in a first level key output from each of the PUF cells when the first level key may be generated.

The error correction unit may further include a block decoder configured to perform block decoding using the error correction code and the second helper data read out from the non-volatile memory to correct an error in a second level key output from the bit decoder.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 2 is a drawing illustrating a 3-bit coding table according to one exemplary embodiment of the inventive concept;

FIG. 3 is a drawing illustrating a 3-bit coding table according to another exemplary embodiment of the inventive concept;

FIG. 4 is a drawing illustrating a 3-bit coding table according to another exemplary embodiment of the inventive concept;

FIG. 5 is a drawing illustrating a 3-bit coding table according to another exemplary embodiment of the inventive concept;

FIG. 6 is a drawing illustrating a 3-bit coding table according to another exemplary embodiment of the inventive concept;

FIG. 7 is a drawing illustrating a 3-bit coding table according to another exemplary embodiment of the inventive concept;

FIG. 8 is a drawing illustrating a 5-bit coding table according to one exemplary embodiment of the inventive concept;

FIG. 9 is a drawing illustrating a 5-bit coding table according to another exemplary embodiment of the inventive concept;

DETAILED DESCRIPTION

Figure 1:
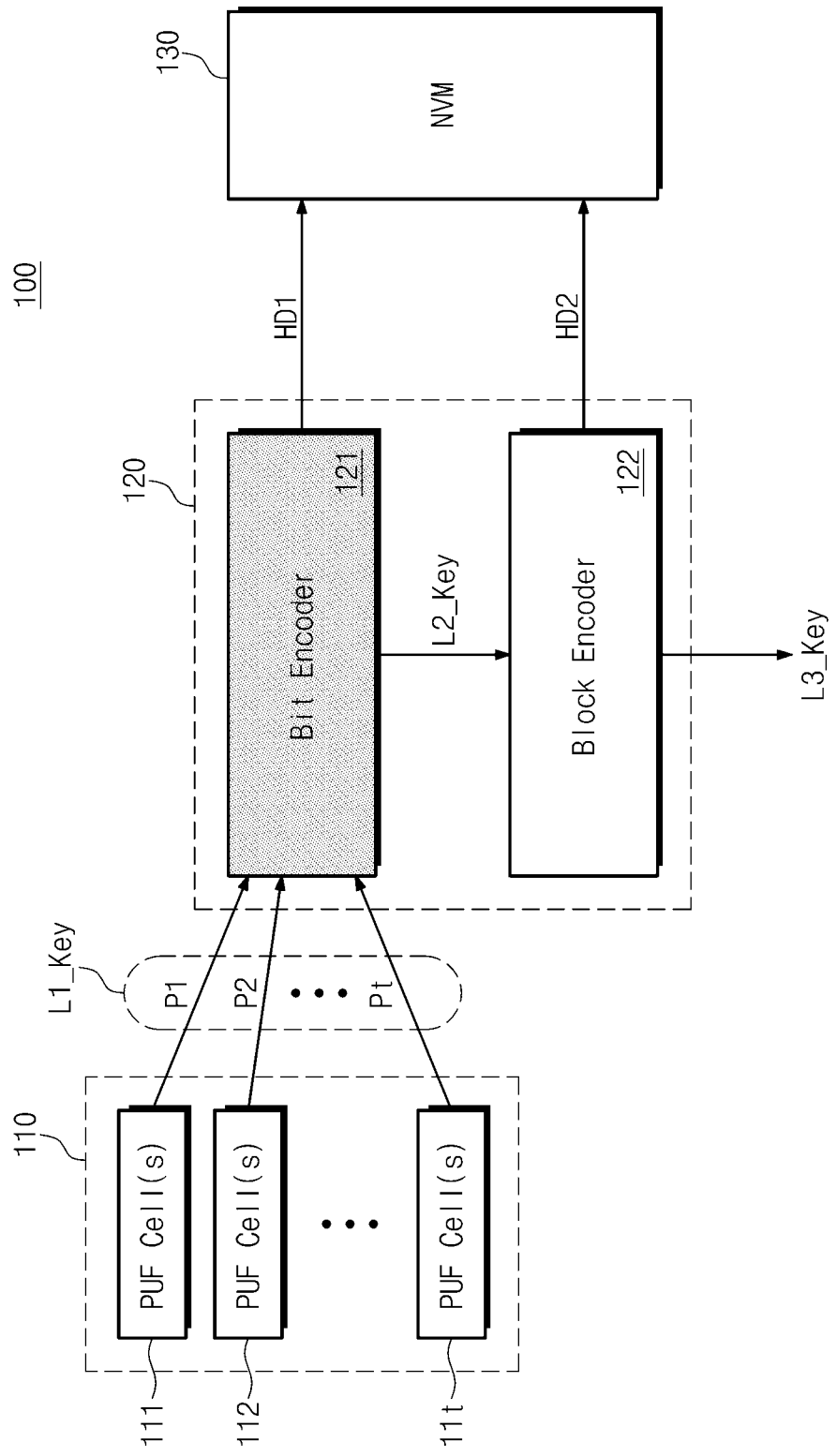
FIG. 1 is a block diagram illustrating a configuration of a PUF circuit according to an exemplary embodiment of the inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity. Also, the phraseology and terminology used in this document are for the purpose of description and should not be regarded as limiting. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As should also be apparent to one of ordinary skill in the art, the systems shown in the figures are models of what actual systems might be like. Some of the modules and logical structures described are capable of being implemented in software executed by a microprocessor or a similar device, or of being implemented in hardware using a variety of components including, for example, application specific integrated circuits ("ASICs"). A term like "processor" may include or refer to both hardware and/or software. No specific meaning is implied or should be inferred simply due to the use of capitalization. The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules. Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

An issue that arises when implementing a PUF circuit is instability in the PUF circuit output value. If the bit error rate (BER) of the PUF output value is too high, the value may be unusable as a key. Therefore, one of the issues in PUF circuit design is to effectively reduce the bit error rate (BER) of an unstable PUF output value. Although two PUF circuits may have the same design, the circuits must generate unique values which differ from chip to chip. That is, the value output from identical PUF circuits should be different from circuit to circuit. In general, a PUF circuit generates a unique electronic signature which differs from chip to chip due to process variations during a chip fabrication process. That is, when the transistors that form the circuit are implemented, slight differences in the circuits occur) due to fabrication process variations. However, slight differences during operation of the circuit may cause the value output by the PUF circuit to have a considerably high BER. In other words, the output value of a PUF circuit may not be fixed to a certain value, but may have a different value due to operating conditions, such as temperature, input voltage, aging, etc.

The stability of the PUF output value should therefore be secured in order to be able to use the PUF output value as an encryption/decryption key and/or an authentication code. Many methods of improving PUF circuit error rates have been proposed. However, because, in general, providing an error correction method in a PUF circuit increases the hardware that is required to implement the PUF circuit, it is an important limiting factor for real mass production.

A PUF key enrollment process may be performed once in an initial stage after a PUF chip is manufactured. Randomly generated keys may be safely stored using a PUF. To correct errors in PUF output values, block-based error correction coding (i.e., block encoding) and bit-based error correction coding (i.e., bit encoding) may be used together. In a previous approach, random bits are generated based on a key size. Helper data generated using the generated random bits are stored in a non-volatile memory. After the key enrollment process is completed, the generated random bits may be discarded without being stored in the non-volatile memory. Keys enrolled through a key enrollment process are recovered and generated through a key generation process. A key may, for example, consist of a 128-bit random number. The value of a keys enrolled through a key enrollment process is recovered using PUF output values. Although there may be errors in the PUF output values, i.e., the PUF output values are different from the values which were generated in the key enrollment stage, the correct PUF output value may be recovered through error correction decoding, such as repetition decoding and/or block decoding, depending on how the PUF value is encoded.

As noted above, random bits may be used as helper data in a typical error correction coding scheme. The amount of helper data which must be stored in a non-volatile memory may be greatly increased as a result of repetition coding. Also, generating random bits may result in increasing the complexity of a system and/or degrading the execution speed of a key enrollment stage.

An error correction scheme for PUF output values according to some embodiments of the inventive concepts may be implemented to safely perform repetition coding and block coding without using random bits, which may thereby improve the performance of a PUF system and/or reduce the use of non-volatile memory considerably.

FIG. 1 is a block diagram illustrating a configuration of a PUF circuit according to some embodiments of the inventive concepts. Referring to FIG. 1, the PUF circuit 100 may include a PUF cell array 110, an error correction unit 120, and a non-volatile memory (NVM) 130.

The PUF cell array 110 may include a plurality of PUF cells 111 to 11$t$ ($t$ is an integer greater than or equal to 2). Each of the PUF cells 111 to 11$t$ may be implemented by at least one of a PUF cell based on a transistor threshold voltage, an arbiter-based PUF cell (e.g., an arbiter PUF cell, a feed-forward PUF cell, an XOR PUF cell in which arbiter PUF cells are disposed in parallel, and a lightweight PUF cell), a ring-oscillator-based PUF cell, a memory-based PUF cell (e.g., a static random access memory (SRAM) PUF cell, a latch PUF cell, a flash memory PUF cell, and a memistor PUF cell), and a laser- or thermal-reconfigurable PUF cell. In some embodiments of the inventive concepts, the PUF cell array 110 may generate a first level key L1_Key. Herein, the first level key L1_Key may include values P1 to Pt, each of which is output from a corresponding one of the PUF cells 111 to 11$t$.

In some embodiments of the inventive concepts, the output values P1 to Pt of the PUF cells 111 to 11$t$ may be a plurality of bit values which are output continuously by the PUF cells. In other embodiments of the inventive concepts, the output values P1 to Pt of the PUF cells 111 to 11$t$ may include a plurality of bit values that are output from a plurality of unit cells constituting each of the PUF cells 111 to 11$t$.

The error correction unit 120 may include a bit encoder 121 and a block encoder 122. The error correction unit 120 may generate a second level key L2_Key and first helper data HD1 that may be used to correct errors in the first level key L1_Key. The first helper data HD1 may be generated by performing bit encoding of the first level key L1_Key using the bit encoder 121. Also, the error correction unit 120 may generate a third level key L3_Key and second helper data HD2 that may be used to correct errors in the second level key L2_Key. The third level key L3_Key may be generated by performing block encoding of the second level key L2_Key using the block encoder 122.

The bit encoder 121 may receive the first level key L1_Key from the PUF cell array 110, and may generate the second level key L2_Key by performing bit encoding of the first level key L1_Key. Also, the bit encoder 121 may generate the first helper data HD1 corresponding to the second level key L2_Key and may store the first helper data in the NVM 130. The bit encoding may be performed, for example, using a bit coding table based on Hamming weights.

In some embodiments of the inventive concepts, the bit encoder 121 may receive output values from the PUF cells 111 to 11t n times (where n is an integer greater than or equal to 3) and may determine encoded values of the PUF cells 111 to 11k according to Hamming weights (that is, the number of bits of "1") about the output values received n times. Herein, the output values determined by the bit encoder 121 may constitute the second level key L2_Key.

To describe generation of a part of the second level key L2_Key of the bit encoder 121, it is assumed that the bit encoder 121 performs 3-bit encoding. If three values sequentially output from the first PUF cell 111 are "101", a Hamming weight may be an even number. Accordingly, an output value of the first PUF cell 111 may be encoded into "0". In contrast, when three values sequentially output from the first PUF cell 111 are "001", the Hamming weight may be an odd number. Accordingly, an output value of the first PUF cell 111 may be encoded into "1". However, the scope and spirit of the inventive concepts may not be limited to the above-described bit encoding method. When the Hamming weight is an even number, an output value of a PUF cell may be encoded into "1". When the Hamming weight is an odd number, an output value of a PUF cell may be encoded into "0".

In an exemplary embodiment of the inventive concept, the bit encoder 121 may generate the first helper data HD1 corresponding to the second level key L2_Key. In an exemplary embodiment of the inventive concept, the first helper data HD1 may be data associated with mask data generated according to a variety of bit coding tables.

The block encoder 122 may block encode the second level key L2_Key that is output from the bit encoder 121 using an error correction code (ECC), and may output a third level key L3_Key as a result of performing the blocking encoding. In some embodiments of the inventive concept, the ECC may be at least one of a Low Density Parity Check (LDPC) code, a Bose Chaudhuri Hocquenghem (BCH) code, a turbo code, a Reed-Solomon code, a convolution code, a Recursive Systematic Code (RSC), and coded modulations such as a Trellis-Coded Modulation (TCM) and a Block Coded Modulation (BCM). Also, the block encoder 122 may generate second helper data HD2 corresponding to the third level key L3_Key output by performing the block encoding, and may store the second helper data HD2 in the NVM 130.

The NVM 130 may store the first and second helper data HD1 and HD2. In FIG. 1, an embodiment of the inventive concept is exemplified as the NVM 130 is configured in the PUF circuit 100. However, the scope and spirit of the inventive concept may not be limited thereto. For example, the NVM 130 may be configured outside the PUF circuit 100.

The PUF circuit 100 according to an exemplary embodiment of the inventive concept may perform bit coding using a bit coding table based on Hamming weights without generating random bits.

FIGS. 2 to 11 illustrate a non-exhaustive variety of bit coding tables.

FIG. 2 illustrates a 3-bit coding table according to some embodiments of the inventive concepts. Three-bit encoding may be performed according to the table shown in FIG. 2.

In the table shown in FIG. 2, the first column Pi represents the possible values of the Level 1 key (L1_Key) output by the ith PUF cell 11i. The second column represents the mask data Mi associated with each possible value of the Level 1 key Pi. The third column represents a combination value Ri that is a repeated value of the level 2 key (L2_Key) Ki that is output by the bit encoder, while the fourth column represents the value of the L2_Key associated with each value of Pi. The fifth column represents the helper data Hi which is stored in the nonvolatile memory 130 associated with each possible value of Pi.

For example, referring to the first row of the table shown in FIG. 2, when the output value Pi of a PUF cell is "000", the Hamming weight is of the output value Pi is "0". In that case, the key value Ki may be "0". A combination value Ri is generated by performing 3-bit repetition encoding on the key value Ki. Thus, for a key value Ki of "0", the repetition coded value Ri is "000".

The mask data value Mi may be a data value that generates the combination value Ri when the output value Pi of the PUF cell is XORed with the mask data value Mi (i.e., Ri=Pi XOR Mi). Continuing the previous example, when the combination value is "000" and the output value Pi is "000", the mask data value Mi is "000". The mask data value Mi may be calculated from the output data value Pi and the combination value Ri as Mi=Pi XOR Ri. The helper data value Hi may be set to be equal to the mask data value, in this case "000".

Similarly, when an output value Pi of a PUF cell is "001" as shown in the second row of the table shown in FIG. 2, the Hamming weight of the output value Pi is "1". In that case, the key value Ki may be "1". The combination value Ri may therefore be "111", which is obtained by performing 3-bit repetition encoding of the key value Ki. The mask data value Mi, which is a data value for generating the combination value by XORing the mask data value Mi with the output value Pi of the PUF cell, may be "110" in this case. The helper data value Hi may be set as the mask data value Mi of "110".

In general, if bit encoding is performed, because the helper data HD1 (refer to FIG. 1) generated for each bit has one bit or more, the second level key L2_Key may be recovered using only the helper data HD1. As known in typical repetition coding, a 1-bit error may be recovered through majority decision for a value that results from XORing a value Hi of a helper data HD1 and a PUF output value Pi. In a majority decision, if there are more ones than zeros in the data, the result is a one, and if there are more zeros than ones in the data, the result is a zero.

As an example, assume that the output values of the first to third PUF cells 111 to 113 are generated as "101." According to the table in FIG. 2, the helper data Hi corresponding to the output values generated in the key enrollment stage is "101". Continuing the example, assume a bit error is generated in the output of the first PUF cell 111 during a key generation stage. For example, assume that the PUF output value Pi generated in the key generation stage is "001" instead of the enrollment value of "101." In that case, when the output value of "001" is XORed with the helper data of "101," the resulting value is "100." The recovered key value Ki for the PUF output value Pi of "001" is "0" according to majority decision for the XORing value of "100".

Figure 17:
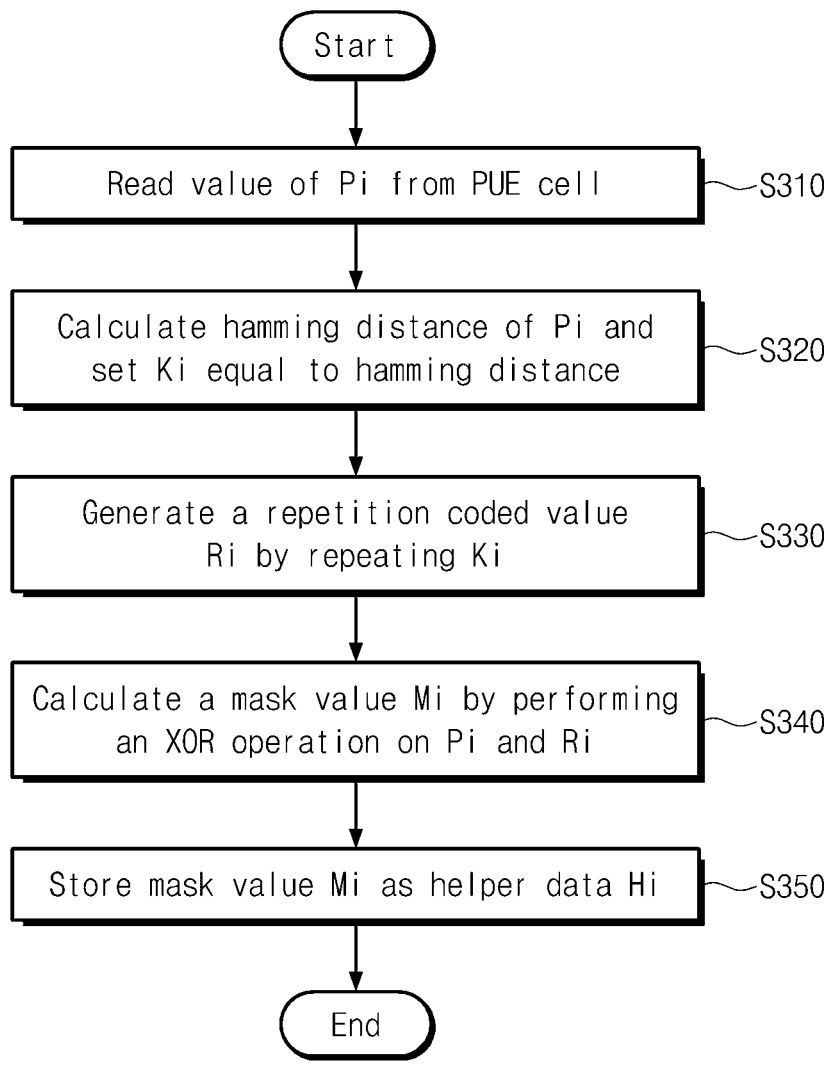
FIG. 17 is a flowchart that illustrates the enrollment of a first level key and generation of first helper data.

FIG. 17 is a flowchart that illustrates the enrollment of a first level key (L1_Key) and generation of first helper data. Referring to FIG. 17, an ith value Pi of PUF data is read from a PUF cell (block S310). The Hamming distance of Pi is calculated, and Ki is set equal to the Hamming distance of Pi (block S320). A repetition value Ri is then generated by repeating the value of Ki n times (block S330). A mask value Mi is then generated by performing an XOR operation on Pi and Ri, that is, Mi=Pi XOR Ri (block S330). The mask value Mi is stored as the ith helper data Hi in a nonvolatile memory (NVM) (block S340).

Figure 18:
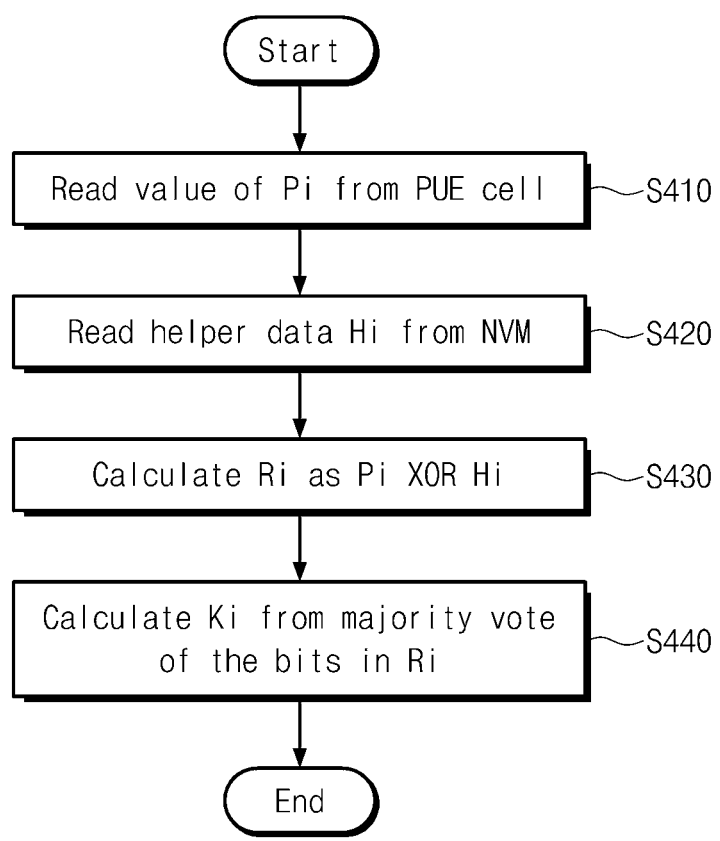
FIG. 18 is a flowchart that illustrates the generation of a first level key from PUF values and stored helper data.

FIG. 18 is a flowchart that illustrates the generation of a first level key (L1_Key) from PUF values and stored helper data. First, a value of Pi is read from the PUF cell (S410). The value of Pi may have errors therein due to changes in operating conditions of the PUF cell (temperature, aging, etc.) That is, the value of Pi read from the PUF cell may be different from the value that was read from the PUF cell during the enrollment process.

Helper data Hi corresponding to the ith value Pi is read from the nonvolatile memory (NVM) in which it was stored (block S420). A value of Ri is then calculated as Pi XOR Hi (block S430). The value of Ki may then be calculated based on a majority vote of the bits in Ri (block S440).

In case of 3-bit encoding, a size of the PUF output value Pi may be 3 times larger than that of the second level key L2_Key. Accordingly, in general, in case of n-bit encoding, the following equation may be calculated using Equation 1.

$$\text{Size}(L1\_Key) = n \times \text{Size}(L2\_Key) \quad [\text{Equation 1}]$$

As shown in FIG. 2, the bit coding table may be configured in a number of ways. To be safely used in a PUF circuit 100 (refer to FIG. 1), the following two conditions must be satisfied in the bit coding table.

In a first condition, to perform bit decoding using majority decision, an value Ri obtained by XORing the PUF output value Pi with the mask data value Mi must be a bit stream of '1's (that is, "111") or a bit stream of '0's (that is, "000"). In a second condition, so that a key value Ki cannot be inferred from only a mask data value Mi, a key value Ki of either a "0" or a "1" may be obtained with respect to each mask data value. For example, in the case when the mask data value Mi is "000", when a PUF output value is "000", the key value Ki is "0", and when a PUF output value Pi is "111" the key value Ki is "1".

To meet the above-described two conditions, the number of values of the mask data values Mi may be a half of the number of PUF output values. To meet the first condition, each of the PUF output values Pi may correspond to one corresponding mask data value Mi which has the same value as each of the PUF output values Pi or has an inverse value of the PUF output values Pi. For example, in the coding table shown in FIG. 2, the mask data value Mi of '000' corresponds to both PUF output values Pi of '000' and '111,' the mask data value Mi of '110' corresponds to both PUF output values Pi of '001' and '110,' etc. Also, to meet the second condition, each of the PUF output values Pi may correspond to one corresponding mask data value Mi which has the same value as each of the PUF output values Pi or has an inverse value of each of the PUF output values Pi. As a result, two PUF output values Pi which have an inverse relation to each other may be configured as one pair. Each of a plurality of pairs may have the same mask data value Mi and may also have a mask data value Mi which is different from the other pairs. Accordingly, a space of the mask data values Mi may be a half of a space of the PUF output values Pi, thereby representing each of the mask data values Mi by only 2 bits.

FIG. 3 illustrates a 3-bit coding table according to other exemplary embodiments of the inventive concepts. Referring to FIG. 3, a 3-bit coding table has different helper data values Hi compared to the 3-bit coding table shown in FIG. 2. Each of the helper data values Hi may be represented by two most significant bits (MSBs) by representing each mask data values Mi using only 2 bits.

However, the scope and spirit of the inventive concepts may not be limited to the helper data values Hi shown in FIG. 3. For example, the helper data value Hi may be represented by one MSB and one least significant bit (LSB).

FIG. 4 illustrates a 3-bit coding table according to further embodiments of the inventive concepts. Referring to FIG. 4, a 3-bit coding table may use different helper data values Hi from the helper values in the 3-bit coding table shown in FIG. 2. Because mask data values Mi may be represented by only 2 bits, the helper data value Hi may be represented by one MSB and one LSB of each of the mask data values Mi.

In other embodiments, each of the helper data values Hi may be represented by two LSBs of corresponding one of the mask data values Mi. FIG. 5 is a drawing illustrating a 3-bit coding table according to further embodiments of the inventive concepts. Referring to FIG. 5, a 3-bit coding table may use different helper data values Hi from those in the 3-bit coding table shown in FIG. 2. Because mask data values Mi may be represented by only 2 bits, each of the helper data values Hi may be represented by two LSBs of corresponding one of the mask data values Mi.

Also, as described above, a pair of mask data values Mi may include mask data values which have an inverse relation to each other. In case of n-bit encoding, because there are a total of 2n−1 pairs, the number of encoding schemes which satisfy the above-described conditions may be calculated using Equation 2 as follows:

$$\text{Number of } n \text{ bit coding} = 2^{(2^{n-1})} \quad [\text{Equation 2}]$$

Therefore, in case of 3-bit encoding, there may be a total of 16 coding schemes. A bit coding table which has a different type and similar characteristics may be configured by inverting the mask data values Mi shown in FIG. 2. For example, FIG. 6 is a drawing illustrating a 3-bit coding table according to further embodiments of the inventive concepts. Referring to FIG. 6, a bit coding table may include inverted mask data values Mi compared to the bit coding table shown in FIG. 2. In other words, key values Ki determined according to Hamming weights may have inverted values in comparison with the key values Ki shown in FIG. 2.

FIG. 7 is a drawing illustrating a 3-bit coding table according to still further embodiments of the inventive concepts. Referring to FIG. 7, a bit coding table may be different in having helper data values Hi, each of which has 2 bits, from the bit coding table shown in FIG. 6. Each of the helper data values Hi may include two MSBs of corresponding one of mask data values Mi. Meanwhile, each of the helper data values Hi according to some embodiments of the inventive concepts may be implemented as a variety of helper data values by selecting two bits among 3 bits constituting each of the mask data values Mi.

Although the foregoing description is given for the 3-bit coding tables shown in FIGS. 2 to 7, the scope and spirit of the inventive concepts may not be limited to a 3-bit coding table. For example, a bit coding table according to some embodiments of the inventive concepts may be a 5-bit coding table. For example, FIG. 8 illustrates a 5-bit coding table according to some embodiments of the inventive concepts. Referring to FIG. 8, each of the helper data values Hi may use 4 bits except for the LSB of corresponding ones of 5 bit mask data values Mi. Accordingly, the helper data values Hi according to embodiments of the inventive concepts may be implemented as a variety of helper data values by selecting four bits among the five bits that constitute each of the mask data values Mi.

FIG. 9 illustrates a 5-bit coding table according to further embodiments of the inventive concepts. Referring to FIG. 9, a 5-bit coding table may have different key values Ki according to Hamming weights in comparison with the 5-bit coding table shown in FIG. 8. Therefore, the 5-bit coding table may be different in mask data values Mi and helper data values Hi from the 5-bit coding table shown in FIG. 8.

Figure 10:
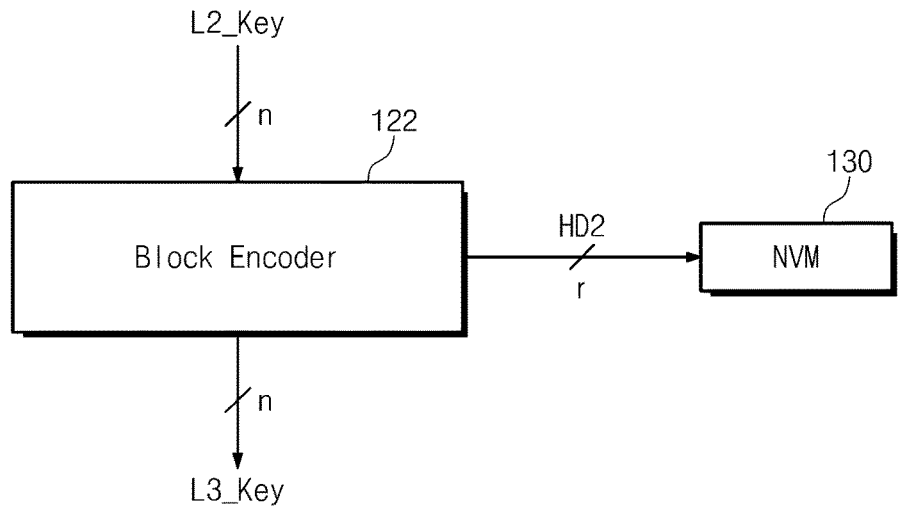
FIG. 10 is a block diagram illustrating block encoding without masking according to an exemplary embodiment of the inventive concept.
Figure 11:
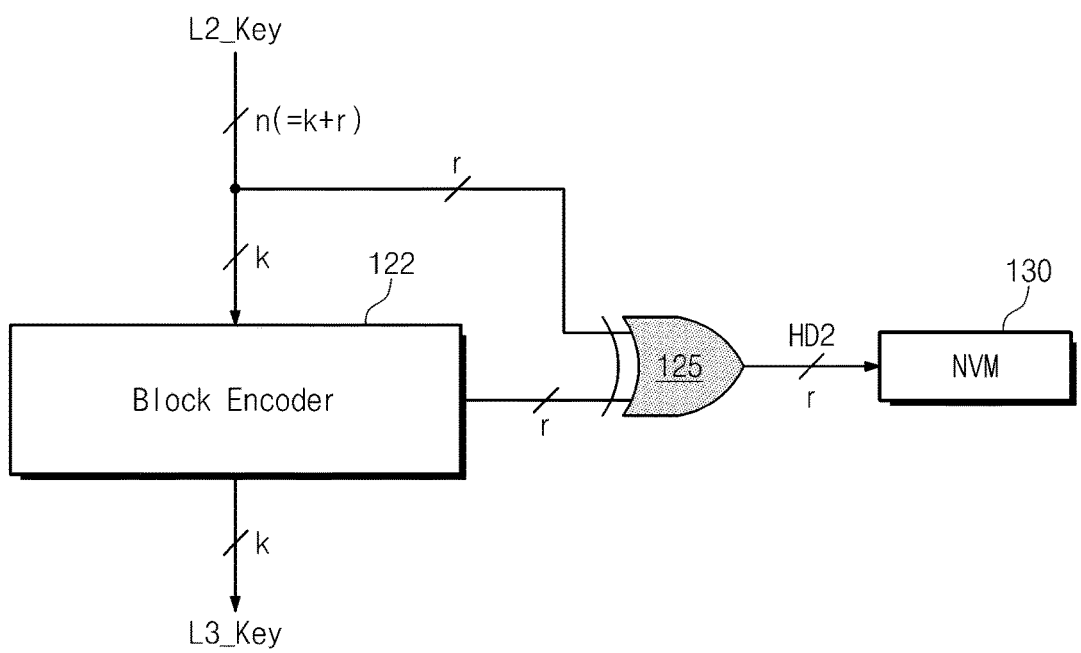
FIG. 11 is a block diagram illustrating block encoding for performing masking according to an exemplary embodiment of the inventive concept.

Block coding (or block encoding) is illustrated in FIGS. 10 and 11. FIG. 10 is a block diagram illustrating block encoding without masking according to some embodiments of the inventive concepts. Referring to FIG. 10, a block encoder 122 may receive a second level key L2_Key of n bits, may generate a third level key L3_Key of n bits, and may generate second helper data HD2 of r bits.

In some embodiments, the second helper data HD2 may not be masked. However, the scope and spirit of the inventive concepts may not be limited to the second helper data HD2. For example, the second helper data HD2 may be masked to enhance security for the third level key L3_Key. FIG. 11 is a block diagram illustrating block encoding for performing masking according to some embodiments of the inventive concepts. Referring to FIG. 11, a block encoder 122 may receive a second level key L2_Key of n (=k+r) bits, may generate a third level key L3 Key of k bits, and may generate masked second helper data HD2 of r bits. An XOR gate 125 may generate masked second helper data HD2 of r bits by XORing a part (that is, r bits) of the second level key L2_Key and the masked data of r bits of the block encoder 122.

As shown in FIG. 11, because the second helper data HD2 are masked by a part of the second level key L2_Key, there may be no information about the third level key L3_Key that can be obtained from the second helper data HD2 alone.

The description is given for the key enrollment method with reference to FIGS. 1 to 11. A description will be given for a key generation method with reference to FIG. 12.

Figure 12:
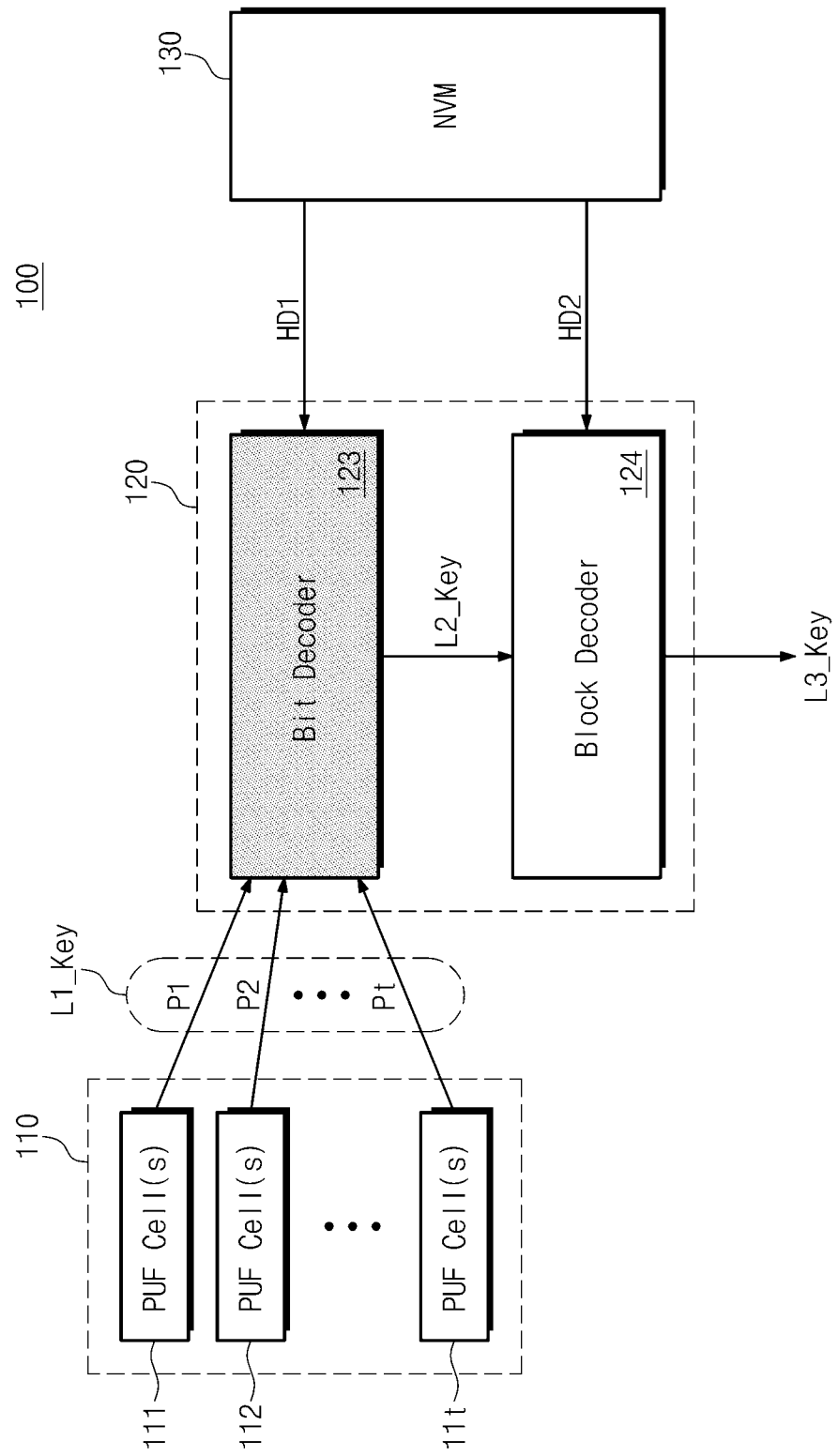
FIG. 12 is a block diagram illustrating key generation according to an exemplary embodiment of the inventive concept.

FIG. 12 is a block diagram that illustrates key generation according to some embodiments of the inventive concepts. Referring to FIG. 12, a key generation process is described as follows. First of all, it is assumed that first helper data HD1 and second helper data HD2 are stored in a non-volatile memory (NVM) 130 in the key enrollment process.

In a key generation process, a PUF cell array 110 may output a first level key L1_Key. In other words, PUF cells 111 to 11t may output PUF output values P1 to Pt of t bits. A bit decoder 123 may perform an error correction operation on each of the PUF output values P1 to Pt oft bits using the first helper data HD1 that is retrieved from a non-volatile memory (NVM) 130. In the error correction operation, key values Ki (refer to FIG. 2) may be determined according to a majority decision of the bits obtained by XORing a PUF output value Pi and a mask data value Mi corresponding to a helper data value Hi. The k key values determined by the error correction operation may be output as a second level key L2_Key.

Thereafter, a block decoder 124 may receive the second level key L2_Key output from the bit decoder 123 and the second helper data HD2 from the NVM 130, and may generate a third level key L3_Key by correcting errors in the second level key L2_Key using a previously determined error correction code. The generated third level key L3_Key may be used as the last key of a PUF circuit 100.

Figure 13:
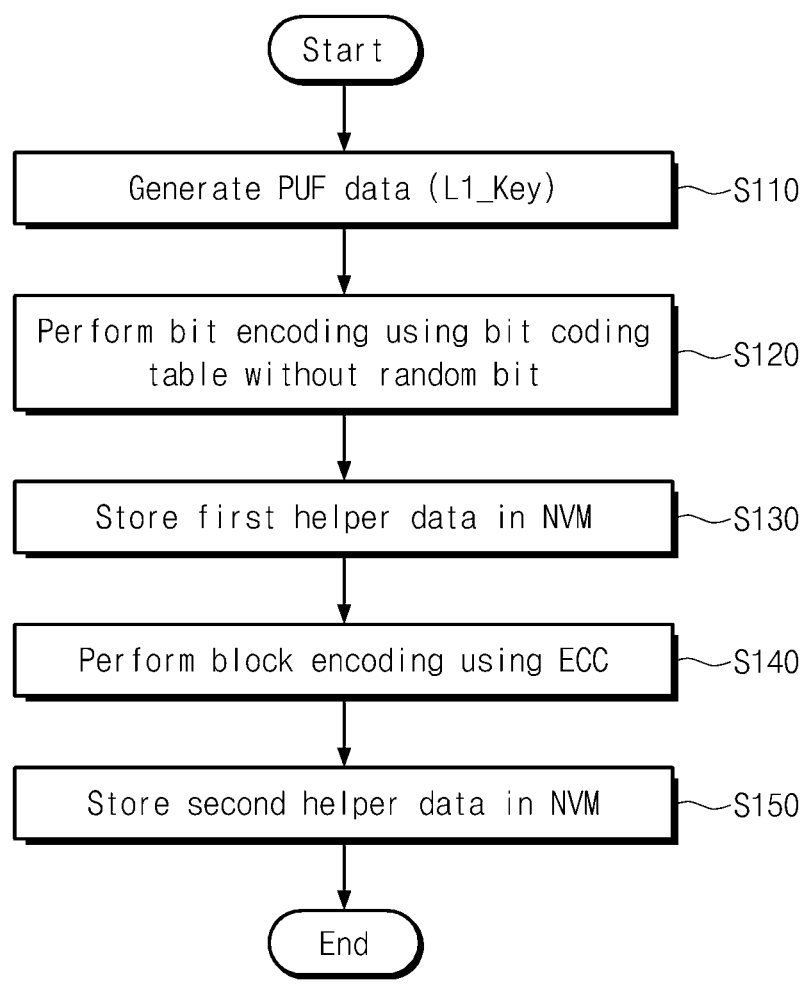
FIG. 13 is a flowchart illustrating a key enrollment method of a PUF circuit according to an exemplary embodiment of the inventive concept.

FIG. 13 is a flowchart illustrating a key enrollment method in a PUF circuit according to embodiments of the inventive concepts. Referring to FIGS. 1 and 13, a description will be given for a key enrollment method of the PUF circuit 100 as follows. In step S110, PUF data may be generated from PUF cells 111 to 11t. The generated PUF data may constitute a first level key L1_Key. In step S120, bit encoding may be performed using a bit coding table without random bits. A second level key L2_Key corresponding to PUF data may be generated as a result of the bit encoding. As shown in FIG. 2, mask data is generated as part of the bit encoding. Therefore, in step S130, first helper data HD1 corresponding to the mask data may be stored in the non-volatile memory 130. Thereafter, in step S140, block encoding using an error correction code may be performed. As a result of the blocking encoding, a third level key L3_Key and second helper data HD2 associated with the third level key L3_Key may be generated. In step S150, the second helper data HD2 may be stored in the non-volatile memory 130, which completes the key enrollment process of the PUF circuit 100.

In some embodiments of the inventive concepts, the key enrollment process of the PUF circuit 100 may be selectively performed by a user of an electronic device that includes the PUF circuit 100, or may be performed by a manufacturer of an electronic device that includes has the PUF circuit 100.

Figure 14:
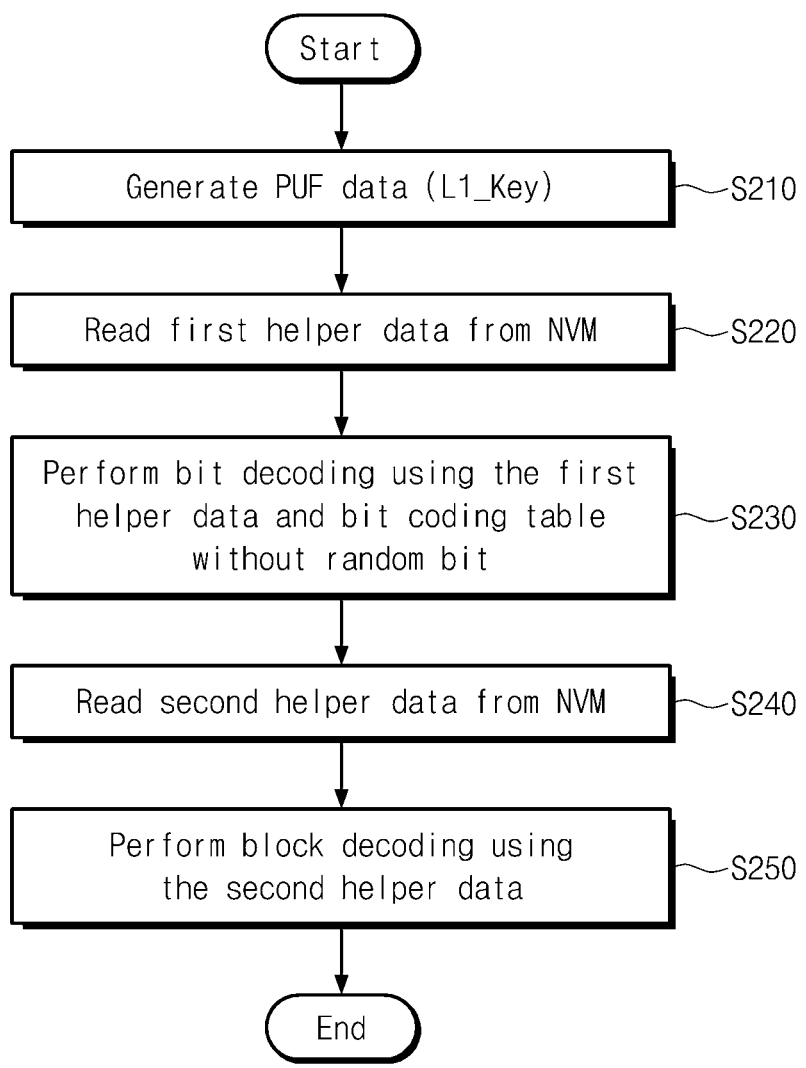
FIG. 14 is a flowchart illustrating a key generation method of a PUF circuit according to an exemplary embodiment of the inventive concept.

FIG. 14 is a flowchart illustrating a key generation method in a PUF circuit according to some embodiments of the inventive concepts. Referring to FIGS. 12 and 14, a description will be given for a key generation method of the PUF circuit 100 as follows. In step S210, PUF data may be output from PUF cells 111 to 11t. The PUF data output by the PUF cells 111 to 11t may constitute a first level key L1_Key. In step S220, first helper data HD1 are read out from the non-volatile memory (NVM) 130. In step S230, bit decoding may be performed using a bit coding table without random bits. As a result of performing the bit decoding, a second level key L2_Key may be generated in which at least some errors in the first level key L1_Key are corrected.

Thereafter, in step S240, second helper data HD2 are read out from the NVM 130. In step S250, block decoding using an error correction code may be performed. As a result of performing the block decoding, a third level key L3_Key may be generated in which at least some errors in the second level key L2_Key are corrected. The generated third level key L3_Key may be the last key of the PUF circuit 100. Therefore, the generation of the PUF circuit may be ended.

In a PUF circuit 100 according to embodiments of the inventive concepts, it may be unnecessary to generate random bits for use in the bit encoding/decoding processes. Moreover, the size of helper data (e.g., first helper data) used in key error correction may be reduced. Additionally, although there may be a bias in a PUF output value, it is possible to use coding to improve the bias of a generated key considerably.

A description will now be given for the reason why a key bias of the PUF circuit may be improved. There are many coding methods for providing n bits. When a proper coding method is selected among selectable coding methods, a bias of the PUF circuit may be improved.

As shown in FIGS. 3 to 7, a key value Ki may be calculated as a checksum of a PUF output value Pi of 3 bits. In other words, if a Hamming weight of the PUF output value Pi is an even number, a key value Ki is "0". If a Hamming weight is an odd number, a key value Ki is "1". Assuming that the PUF output value Pi is biased by ε, a probability that a given value of Pi will be generated may be calculated using Equation 3.

$$Pr(Pi=1) = \tfrac{1}{2} + \varepsilon \qquad \text{[Equation 3]}$$

The bias of the PUF output value Pi may be maintained to a key value Ki without change. However, according to the bit coding tables shown in FIGS. 2 to 7, it may be known that the bias of the PUF output value Pi may be improved according to Equation 4.

$$Pr(Ki=1) = c_1^3 \cdot (Pi)^1 \cdot (1-Pi)^2 + C_3^3 \cdot (Pi)^3 \cdot (1-Pi)^0$$

$$= 3 \cdot (\tfrac{1}{2}) \cdot (\tfrac{1}{2}-\varepsilon)^2 \cdot (\tfrac{1}{2}-\varepsilon)^3$$

$$= 3 \cdot (\tfrac{1}{8} - \tfrac{1}{4}\varepsilon - \tfrac{1}{2}\varepsilon^2 + \varepsilon^3) + (\tfrac{1}{8} - \tfrac{3}{4}\varepsilon - \tfrac{3}{2}\varepsilon^2 + \varepsilon^3)$$

$$= \tfrac{1}{2} + 4\varepsilon^3 \quad |Pr(Ki=1) - \tfrac{1}{2}| = 4\varepsilon^3 \qquad \text{[Equation 4]}$$

Therefore, as a result, a bias ε' of bit encoding is reduced by ε to the power of 3.

The foregoing description is given for reducing the bias of the 3-bit encoding shown in FIGS. 2 to 7. In case of 5-bit encoding as shown in FIGS. 8 and 9, a bias of the 5-bit encoding may be reduced more than that of the 3-bit encoding. According to the bit coding tables shown in FIGS. 8 and 9, it may be known that the bias is improved according to Equation 5.

$$Pr(Ki=1)$$

$$= c_1^5 \cdot (Pi)^1 \cdot (1-Pi)^4 + C_3^5 \cdot (Pi)^3 \cdot (1-Pi)^2 + C_5^5 \cdot (Pi)^5$$

$$= \tfrac{1}{2} - 16\varepsilon_\varepsilon^{5\prime} = |Pr(Ki=1) - \tfrac{1}{2}| = 16\varepsilon^5 \qquad \text{[Equation 5]}$$

Therefore, as a result, a bias ε' of bit encoding is reduced by ε to the power of 5.

Figure 15:
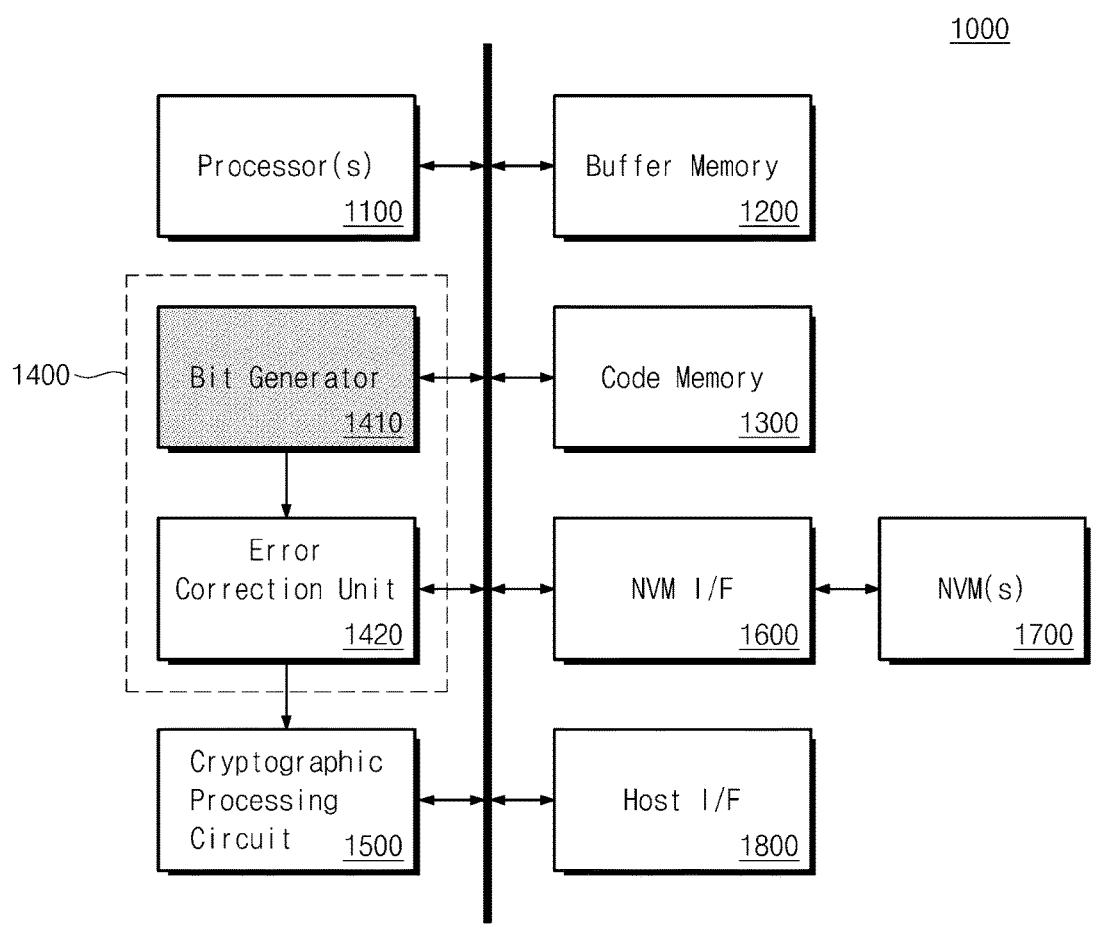
FIG. 15 is a block diagram illustrating a configuration of an electronic device according to an exemplary embodiment of the inventive concept.

FIG. 15 is a block diagram illustrating a configuration of an electronic device according to an exemplary embodiment of the inventive concept. Referring to FIG. 15, the electronic device denoted by 1000 may include at least one processor 1100, a buffer memory 1200, a code memory 1300, a PUF circuit 1400, a cryptographic processing circuit 1500, a non-volatile memory (NVM) interface (I/F) 1600, an NVM 1700, and a host I/F 1800. Herein, the electronic device 1100 may be one of data storage media (e.g., a solid static drive (SSD), a memory stick, and a universal flash storage (UFS) device), memory cards (e.g., a secure digital (SD) card, a multimedia card (MMC), and an embedded MMC (eMMC)), smart cards, mobile devices (e.g., a smart phone and a galaxy tab) and the like.

The processor 1100 may control an overall operation of the electronic device 1000. The buffer memory 1200 may be operated under control of the processor 1100. The buffer memory 1200 may temporarily store data processed by the processor 1100, and may buffer data transmitted to the NVM 1700 or data read out from the NVM 1700. In an exemplary embodiment of the inventive concept, the buffer memory 1200 may be one of a random access memory (RAM), a static RAM (SRAM), and a phase-change RAM (PRAM).

The code memory 1300 may store codes and/or applications for managing/operating the electronic device 1000. In an exemplary embodiment of the inventive concept, the code memory 1300 may be one of a read only memory (ROM) and a PRAM.

The PUF circuit 1400 may generate keys necessary for security. The PUF circuit 1400 may be implemented by the PUF circuit 100 shown in FIGS. 1 and 12. The PUF circuit 1400 may be implemented by at least one of hardware, software, and firmware. The PUF circuit 1400 may include a bit generator 1410 for generating PUF data and an error correction unit 1420 for correcting an error of the generated PUF data. The bit generator 1410 may be implemented by the PUF cell array 110 shown in FIG. 1. The error correction unit 1420 may include the bit encoder 121 and the block encoder 122 which are shown in FIG. 1 and the bit decoder 123 and the block decoder 124 which are shown in FIG. 12.

The cryptographic processing circuit 1500 may perform an encryption/decryption operation of input and output data using a key value output from the PUF circuit 1400.

The cryptographic processing circuit 1500 may transmit and receive data with and from the NVM 1700 through the NVM I/F 1600. The NVM 1700 may be one of a NAND flash memory, a vertical NAND (VNAND), a NOR flash memory, a resistive RAM (RRAM), a PRAM, a magnetoresistive RAM (MRAM), a ferroelectric RAM (FRAM), a spin transfer torque-RAM (STT-RAM) and the like. Also, the NVM 1700 may be implemented by a three-dimensional array structure.

The host I/F 1800 may be connected with an external host through one of a parallel AT attachment (PATA) bus, a serial AT attachment (SATA) bus, a small computer system interface (SCSI), a universal serial bus (USB), a peripheral component interconnect express (PCIe), an SD, a serial attached small computer system interface (SAS), a UFS, an eMMC, an MMC, a NAND interface and the like.

Though not illustrated in FIG. 15, the electronic device 1000 may further include an error correction code (ECC) circuit. The ECC circuit may generate an ECC for correcting a fail bit or an error bit of data received from the NVM 1700, may perform error correction encoding about data provided to the NVM 1700, and may configure data to which a parity bit is added. The parity bit may be stored in the NVM 1700. Also, the ECC circuit may perform error correction decoding about data output from the NVM 1700. The ECC circuit may correct an error using the parity bit. The ECC circuit may correct an error using one of a Low Density Parity Check (LDPC) code, a BCH code, a turbo code, a Reed-Solomon code, a convolution code, a Recursive Systematic Code (RSC), and coded modulations such as a Trellis-Coded Modulation (TCM) and a Block Coded Modulation (BCM).

Though not illustrated in FIG. 15, the electronic device 1000 may mount a wireless communication function (e.g., wireless-fidelity (Wi-Fi)).

The PUF circuit according to an exemplary embodiment of the inventive concept may be applied to a smart card.

Figure 16:
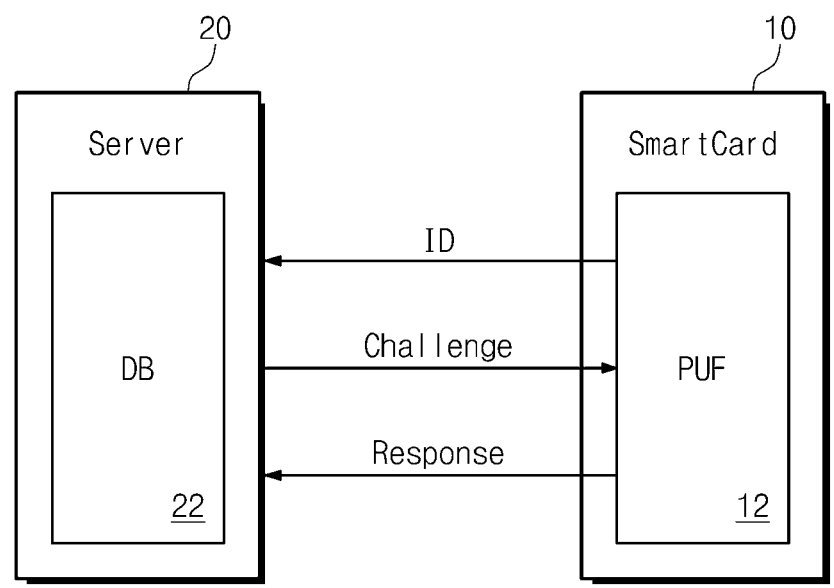
FIG. 16 is a drawing illustrating an authentication procedure of a smart card according to an exemplary embodiment of the inventive concept.

FIG. 16 is a drawing illustrating an authentication procedure of a smart card according to an exemplary embodiment of the inventive concept. Referring to FIG. 16, the smart card denoted by 10 may transmit an identification (ID) corresponding to a key value generated by a PUF circuit 12 to a server 20. The PUF circuit 12 may be implemented by the PUF circuit shown in FIGS. 1 and 12. Herein, the ID is a unique value in only the PUF circuit 12 of the smart card 10. The server 20 may verify whether the ID of the smart card 10 is registered in a database (DB) 22. When the ID of the smart card 10 is registered in the DB 22, the server 20 may generate a challenge corresponding to the ID and may transmit the challenge to the smart card 10. The smart card 10 may receive the challenge from the server 20, may generate a response using the PUF circuit 12, and may transmit the response to the server 20. Therefore, the smart card 10 and the server 20 may safely perform an authentication procedure while basically blocking the malicious intent of an attacker.

As described above, a PUF circuit and a key enrollment method thereof according to the inventive concepts may perform bit encoding without separate random bits, may reduce a size of helper data, and may reduce a bias of an output key by performing bit encoding using a bit coding table based on Hamming weights of a PUF output value.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of storing secure key enrollment information into a nonvolatile memory device, the method comprising:
   generating a plurality of first key values from a physically unclonable function (PUF) source of the secure key information, each of the plurality of first key values including a plurality of first bits;
   performing bit-encoding on each of the plurality of first key values based on a hamming weight of the plurality of first bits in the each of the plurality of first key values, to generate a plurality of second bits and mask data including a plurality of mask values;
   storing first helper data corresponding to the mask data into the nonvolatile memory device;
   performing block-encoding on the plurality of second bits using block-based error correction coding to generate a plurality of third bits and second helper data; and
   storing the second helper data into the nonvolatile memory device
   wherein the first helper data and the second helper data comprise the secure key enrollment information, and
   wherein each of the plurality of mask values is generated based a corresponding one of the plurality of first key values and a repetition encoded value of one of the plurality of second bits that corresponds to the one of the plurality of first key values.

2. The method of claim 1, wherein a logic operation on each of the first key values and corresponding one of the plurality of mask values generates a predetermined value.

3. The method of claim 2, wherein each of the mask values comprises a plurality of bits, the plurality of bits is same as a number of the first bits of each of the first key value, and
   the predetermined value a bit stream of which all bits are one of "1" and "0".

4. The method of claim 1, wherein if the hamming weight is even, a corresponding one of the plurality of second bits is a first logic value, and
   if hamming weight is odd, the corresponding one of the plurality of second bits is a second logic value.

5. The method of claim 4, wherein if the corresponding one of the plurality of second bits is the first logic value, corresponding one of the plurality of first key values is the same as corresponding one of the plurality of mask values,
   if the corresponding one of the plurality of second bits is the second logic value, corresponding one of the plurality of first key values is a value to which the corresponding one of the plurality of mask values is inverted.

6. The method of claim 1, wherein a space of the plurality of mask values is a half of a space of the plurality of first key values.

7. The method of claim 1, wherein the first helper data comprises a plurality of first helper values, each of the plurality of first helper values including at least a part of corresponding one of the plurality of the mask values.

8. The method of claim 1, the performing block-encoding on the plurality of second bits comprises:
   performing the block-encoding on at least part of the plurality of second bits to generate second mask data; and
   XORing the second mask data and rest of the plurality of second bits to generate the second helper data.

9. The method of claim 1, wherein a number of the plurality of second bits is greater than a number of the plurality of third bits.

10. The method of claim 1, wherein the PUF source of the secure key information is a PUF array including a plurality of PUF cells.

11. The method of claim 10, wherein the plurality of first key values are generated from the plurality of PUF cells, respectively.

12. A method of generating a secure key from key enrollment information, the secure key for an electronic device including a physically unclonable function (PUF) circuit and a nonvolatile memory, the method comprising:
    generating a plurality of first key values, each of the plurality of first key values including a plurality of first bits;
    reading a plurality of first helper data values included in the key enrollment information stored in the nonvolatile memory, each of the plurality of first helper data values corresponding to the each of the plurality of first key values;
    performing bit error correction operation on the each of the plurality of first key values using the plurality of first helper data values to generate a plurality of second key values;
    reading second helper data included in the key enrollment information stored in the nonvolatile memory;
    performing block error correction operation on the plurality of second key values using the second helper data to correction an error in the plurality of second key values; and
    outputting the plurality of second key values in which the error is corrected as the secure key,
    wherein the plurality of first helper data comprises mask data including a plurality of mask values, each of the plurality of mask values being based a corresponding one of the plurality of first key values and a repetition encoded value of a second bit that corresponds to the one of the plurality of first key values.

13. The method of claim 12, wherein the bit error correction operation comprises:
    performing a logical operation on the each of the plurality of first key values and each of the plurality of first helper data values; and
    performing a majority voting operation on a result of the logical operation to generate the plurality of second key values.

14. The method of claim 12, wherein the plurality of first key values are generated from the physically unclonable function (PUF) circuit including a plurality of PUF cells.

15. The method of claim 12, further comprising:
    transmitting, to an external server, an identification (ID) corresponding to the secure key;
    receiving, from the external server, a challenge corresponding to the ID; and
    transmitting, in response to the challenge, a response to the external server.

16. An electronic device comprising:
    a nonvolatile memory;
    a secure key source circuit configured to generate a plurality of first key values, each of the plurality of first key values including a plurality of first bits; and an error correction unit configured to correct errors in each of the plurality of first key values, wherein the error correction unit comprises:

a bit encoder configured to perform bit encoding on each of the plurality of first key values to generate a plurality of second bits and a plurality of mask values, each of the plurality of second bits corresponding to hamming weight in the each of the plurality of first key values, each of the plurality of mask values corresponding to the each of the plurality of first key values; and a block encoder configured to perform block encoding on the plurality of second bits using an error correction code to generate a third level key and second helper data, and to output the second helper data to the nonvolatile memory, wherein a logical operation between one of the plurality of first key values and a corresponding one of the mask values generates a predetermined value, wherein each of the plurality of mask values is generated based a corresponding one of the plurality of first key values and a repetition encoded value of one of the plurality of second bits that corresponds to the one of the plurality of first key values, wherein the error correction unit is implemented as hardware and/or program code executed by a microprocessor, and wherein the electronic device further comprises a cryptographic processing circuit configured to perform an encryption operation or a decryption operation of input data or output data using the third level key.

17. The electronic device of claim 16, wherein the secure key source circuit comprises a plurality of physically unclonable function (PUF) cells, each of the plurality of PUF cells being based on a transistor threshold voltage, and the plurality of first key values are generated from the plurality of PUF cells, respectively.

18. The electronic device of claim 17, wherein a space of the mask values is a half of a space of the plurality of first key values.

19. The electronic device of claim 17, wherein the bit encoder performs the bit encoding without random bits.

\* \* \* \* \*